(12) United States Patent
Orrling et al.

(10) Patent No.: US 6,500,224 B1
(45) Date of Patent: Dec. 31, 2002

(54) METHOD FOR OPERATING A STEELMAKING FURNACE DURING A STEELMAKING PROCESS

(75) Inventors: Carl F. Orrling, Allentown, PA (US); Daniel Goldstein, Lafayette Hill, PA (US)

(73) Assignee: Bethlehem Steel Corporation

(*) Notice: Subject to any disclaimer, the term of this patent is extended or adjusted under 35 U.S.C. 154(b) by 0 days.

(21) Appl. No.: 09/975,134

(22) Filed: Oct. 11, 2001

(51) Int. Cl.7 .............................................. C21B 13/12
(52) U.S. Cl. .................. 75/10.12; 75/10.41; 75/10.45; 75/382; 75/548; 75/554; 75/558
(58) Field of Search ............................. 75/10.12, 10.41, 75/10.45, 382, 548, 554, 558

(56) References Cited

U.S. PATENT DOCUMENTS

| | | |
|---|---|---|
| 1,802,693 A | 4/1931 | Anderson |
| 2,845,343 A | 7/1958 | Kanamori |
| 3,180,726 A | 4/1965 | Nakamura |
| 3,495,814 A | 2/1970 | Kirkland |
| 4,405,365 A | 9/1983 | Robert |
| 4,830,666 A | 5/1989 | Tekatch |
| 5,135,572 A | 8/1992 | Ibaraki et al. |
| 5,328,658 A | 7/1994 | Egawa et al. |
| 5,417,740 A | 5/1995 | Galperin et al. |
| 5,743,938 A * | 4/1998 | Nishikawa et al. ........... 75/551 |
| 6,077,324 A * | 6/2000 | Fritz .......................... 75/10.12 |
| 6,136,066 A | 10/2000 | Lynn et al. |
| 6,190,434 B1 | 2/2001 | Borgianni et al. |

* cited by examiner

*Primary Examiner*—Melvyn Andrews
(74) *Attorney, Agent, or Firm*—Harold I. Masteller, Jr.

(57) ABSTRACT

The invention is directed to a method for operating a steelmaking furnace including the steps of charging steelmaking materials into the steelmaking furnace, blowing oxygen into the steelmaking furnace, discontinuing the oxygen blow when the charged steelmaking materials are reduced to a liquid steel product, determining the temperature of the finished liquid steel product, blowing a nitrogen gas coolant into the steelmaking furnace to reduce the temperature of the finished liquid steel product to an aim tapping temperature, discontinuing the nitrogen gas coolant blow when the finished liquid steel product temperature is lowered to the aim tapping temperature, and tapping the finished liquid steel product at the aim tapping temperature for downstream processing.

21 Claims, 4 Drawing Sheets

METHOD FOR OPERATING A STEELMAKING FURNACE DURING A STEELMAKING PROCESS

FIELD OF THE INVENTION

This invention is directed to a method for operating an oxygen blown steelmaking furnace, and in particular, it is directed to a method for cooling the liquid steel contained in the furnace by blowing nitrogen gas into the bath after the oxygen blow is discontinued.

BACKGROUND OF THE INVENTION

Steelmaking may be regarded as a rapid oxidation process where iron is refined to produce a high-purity low-carbon liquid steel and molten slag that contains a combination of oxides. The rapid oxidation of the residual elements in the metal provides more than enough heat to produce the liquid steel product and to melt any fluxes that are added to the slag. In many instances, excess heat is generated from the oxidation process, the excess heat raising the liquid steel temperature above a desired tapping temperature. In such cases, the liquid steel must be cooled down to the aim or target temperature before it can be tapped for further processing downstream.

In the past, steelmakers reduced the temperature of their liquid steel by periodically charging additional amounts of cold scrap, iron ores, and/or other coolants such as dolomitic stone, limestone, and revert materials, into the steelmaking furnace. To illustrate, U.S. Pat. No. 6,136,066 granted to Lynn, et al. teaches that during the reaction, temperatures within the furnace are elevated as the blown oxygen removes carbon from the bath. Iron ore is charged during the oxygen blow to provide a cooling affect on the reaction, and the ore charge prevents temperatures from reaching undesirable levels. Lynn, et al. also teaches that a slag/sludge revert produced by the steps of their present invention, in the form of briquettes or granular material, may be blended with the iron ore and charged as a coolant during the oxygen blow.

U.S. Pat. No. 5,135,572 to baraki, et al. also teaches feeding iron ore as a coolant in a steelmaking process. In the examples provided by the inventors, ore, having a particle size distribution as indicated in the tables of the patent, is supplied during the blows as a coolant.

Charging such bulk materials as iron ore and reverts into a steelmaking furnace requires charging systems similar to the drawing figures shown in the Ibaraki, et al. patent. Such systems add installation, logistical, and maintenance costs to a steelmaking operation. For example, complex hopper distribution systems are expensive to install and maintain. Supplying a steelmaking operation with bulk coolant materials is both transportation and labor intensive, and bulk materials require large storage facilities. Finally, purchasing iron ores for use as a coolant further increases costs associated with a steelmaking operation.

SUMMARY OF THE INVENTION

It is therefore an object of the present invention to provide an alternative to charging bulk coolant materials into an oxygen blown steelmaking furnace to achieve aim or target liquid steel temperature.

It is a further object of the present invention to provide an improved method for operating an oxygen blown steelmaking furnace to achieve a liquid steel target temperature.

It is another object of the present invention to provide a method for introducing a coolant into liquid steel manufactured in an oxygen blown steelmaking furnace.

It is an another object of the present invention to blow a cooling gas into a finished molten steel bath whereby the cooling gas provides additional stirring and effective mixing at the molten slag/steel interface to promote removal of impurities such as sulfur and phosphorus from the molten steel.

And finally, it is still another object of the present invention to blow a cooling gas into a finished molten steel bath whereby the blown cooling gas provides additional stirring at the molten slag/steel interface and thereby reduces oxygen levels in the molten steel.

In satisfaction of the foregoing objects and advantages, the present invention provides a method for operating an oxygen blown steelmaking furnace to achieve target temperature in the liquid steel being manufactured therein, the steps of the method include blowing nitrogen gas into the liquid steel after the oxygen blow is completed. The nitrogen gas is blown through the main lance into the liquid steel for a selected time and selected flow rate based upon particular steelmaking conditions, the selected time and selected flow being sufficient to reduce the liquid steel to a target temperature. The nitrogen gas blow into the liquid steel is discontinued when the selected time is reached.

In satisfaction of the foregoing objects and advantages, the present invention provides a method for operating an oxygen blown steelmaking furnace to achieve target temperature in the liquid steel being manufactured therein, the steps of the method include injecting nitrogen gas into the liquid steel after the oxygen blow is completed. The nitrogen gas is typically injected through the main lance or bottom tuyeres into the liquid steel for a selected time and selected flow rate based upon particular steelmaking conditions, the selected time and selected flow being sufficient to reduce the liquid steel to a target temperature. The nitrogen gas blow into the liquid steel is discontinued when the selected time is reached.

BRIEF DESCRIPTION OF THE DRAWINGS

The above and other objects, advantages and novel features of the present invention will become apparent from the following detailed description of the preferred embodiment of the invention illustrated in the accompanying drawings, wherein.

DETAILED DESCRIPTION OF THE PREFERRED EMBODIMENT

Figure 1:
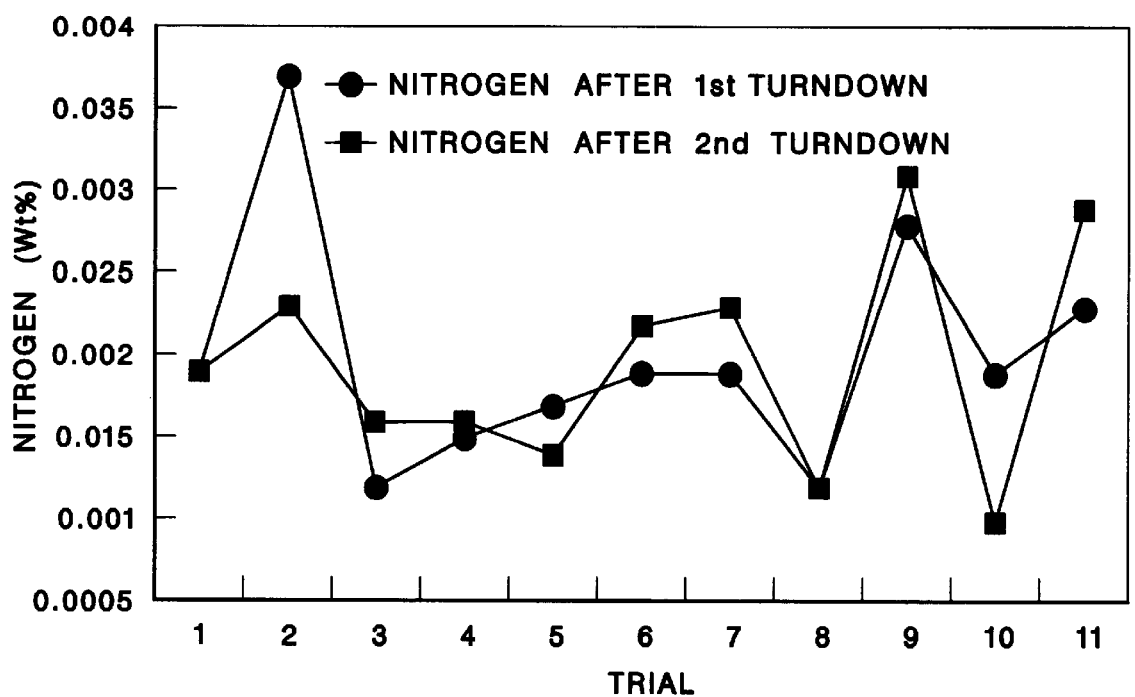
FIG. 1 shows the nitrogen content in a liquid steel bath before and after nitrogen blowing.

The following detailed description of the present invention is directed to blowing nitrogen gas into a liquid steel to reduce the bath temperature to an aim or target temperature required for further downstream processing, for example continuous casting operations. It has been discovered that when the oxygen blow is completed, and after the liquid steel has been sampled for temperature and chemistry, if the measured bath temperature is higher than the specified aim temperature, nitrogen may be blown into the liquid steel as a coolant to reduce bath temperature. It has also been discovered that when nitrogen gas is used as a coolant, the blown nitrogen will reduce the levels of phosphorus and sulfur contained in the liquid steel. Therefore, when these impurities are higher than a specified aim phosphorus or sulfur level, an additional benefit gained from using a blown nitrogen coolant is the reduction of such impurity levels. Finally, it has also been discovered that when a nitrogen gas coolant is blown into liquid steel, the level of free or dissolved oxygen contained in the liquid steel is reduced. Such a free oxygen reduction decreases the amount of aluminum needed to deoxidize the liquid steel product.

Blowing a nitrogen gas coolant into an oxygen blown steelmaking furnace reduces both the liquid steel temperature as well as the temperature of the slag layer floating on the bath surface. Such dual cooling of the different phases must be taken into consideration when nitrogen is blown into the furnace. For example, in steelmaking operations where the tapped liquid steel is delivered to a downstream vacuum degassing operation, the steel is superheated in the steelmaking furnace to a temperature ranging from about 80–130° F. (45–72° C.) above conventional tapping temperatures. Such superheated temperatures are necessary because vacuum degassing causes a rapid drop in the tapped liquid steel temperature. The elevated temperatures also compensate for any temperature losses that may occur with unexpected timing delays between steel tapping and steel degassing operations. In such steelmaking operations, it is desirable to cool the slag layer with minimal cooling of the liquid steel product. In order to accomplish this, the lance tip height is raised to a position above the bath that will reduce the amount of nitrogen gas that penetrates the steel. Proper lance height adjustment is determined by the steelmaking conditions at each particular operation, for example furnace geometry and capacity, aim bath temperature etc., and the lance height is adjusted accordingly for each particular steelmaking furnace.

On the other hand, in a steelmaking operation where it is not desirable to tap a superheated steel, and where the finished liquid steel product is still too hot, above aim tap temperature, the lance tip height may be lowered to a position that will blow greater amounts of nitrogen gas coolant into the liquid steel bath. Given similar steelmaking conditions at the same coolant flow rate, the lowered lance position will provide a greater temperature reduction in the liquid steel bath as compared to the above raised lance example. As before, proper lance height adjustment is determined by the particular steelmaking conditions, and the lance height is adjusted accordingly for each particular steelmaking furnace.

Nitrogen gas blowing is also beneficial as a slag conditioner. In many instances undissolved flux materials, for example burnt lime or dolomitic lime, may be observed floating over the slag layer during a furnace turndown. Such undissolved materials often pile-up in the shape of "icebergs" on top of the slag layer, and they do not dissolve in the liquid slag. It is preferred if the undissolved fluxes melt and dissolve into the liquid slag layer so that the slag chemistry is improved for removal of impurities such as sulfur and phosphorous. The nitrogen blown coolant may be considered a slag conditioner because it provides additional stirring after the steel refining process is completed. The extra stirring during nitrogen cooling mixes the undissolved lime into the liquid slag layer and promotes dissolution of the flux materials into the slag. This extra stirring action results in a more homogeneous slag layer and a cleaner tapped product. Furthermore, the slag layer increases in viscosity in response to the nitrogen gas cooling effect, and the increased viscosity of the cooled slag is beneficial during slag splashing techniques that are used to extend refractory life. Such conditioned slags are better suited for splash coating techniques because the viscous cooled slag more readily sticks to the furnace refractory lining during the splash process.

A basic oxygen furnace (BOF) steelmaking process may be divided into various process events, for example, (1) charging, (2) blowing, (3) sampling, and (4) tapping. Similarly, in electric steelmaking operations that employ oxygen blowing techniques, steelmaking process may be divided into various different process events, for example (1a) charging, (2a) meltdown, (3a) blowing, (4a) sampling, and (5) tapping. During a BOF charging event (1), molten iron, cold steel scrap, alloy, and flux materials are charged into the vessel in amounts that will produce a calculated aim steel heat weight and chemistry. After charging, the main lance is lowered into the vessel and event (2) is initiated by blowing oxygen into the charge at a velocity of between about Mach 1.8–2.5 at flow rates of about 20,000 to 40,000 scfm to oxidize the charge. The oxygen blow is continued until it is determined that the carbon content of the steel has been lowered to desired levels. At such determination, the oxygen blow is discontinued and the lance is removed from the furnace. The vessel is then rotated to a position that allows operators to sample the liquid steel bath, event (3). Such rotation of the vessel is called a turndown, and the liquid steel sample is taken at turndown and tested to determine the steel chemistry and temperature. Based upon these test results, alloying materials may be added, or the steel heat may be re-blown, if operators discover that they must adjust the steel composition or chemistry to a desired level. In addition to the chemical specifications, the heat must also satisfy the desired tap temperature (aim temperature). In the past, when it was determined that the finished steel temperature was too hot for tapping, higher than aim tap temperature, cold scrap, iron ores, and/or other coolants such as dolomite or limestone and revert materials were added to the steel heat to adjust the steel bath temperature before initiating event (4). In the present invention the steel temperature is measured, and in instances where the liquid steel temperature is elevated above aim tap temperature, a nitrogen gas coolant is blown into the furnace to cool the steel bath.

Such nitrogen blows may be done using the top lance that delivers the oxygen during the blowing event (2), or the nitrogen blow may be conducted using an auxiliary top lance or other gas blowing device known in the art without departing from the scope of this invention.

Trial Heats

Thirteen nitrogen blow trials were conducted on our No. 1 Furnace at Burns Harbor. The trials comprised ten heats with two turndowns, one after the oxygen blow was completed and one after the nitrogen cooling blow. The second turndown enabled the operators to more accurately determine the effect of nitrogen blows on the bath steel and slag chemistry and temperature. In the other three heats, a temperature sensor bomb was dropped into the steelmaking furnace after the nitrogen blow was completed to determine temperature change. A second turndown was not performed for these heats. In two of the thirteen trials, flux materials were added to the heat before nitrogen blowing in an attempt to improve dephosphorization and desulfurization, and during the nitrogen blow, the lance height was raised 20 inches higher as compared to the lance height for the main oxygen blow. Finally, in a different two of the thirteen trials, the nitrogen blow flow rate was adjusted from 25,000 to 15,000 scfm so that the effect of different nitrogen flow rates on the bath steel and slag chemistry and temperature could be evaluated. The test results are shown in the drawing FIGS. 1–7.

Referring to FIG. 1, no significant nitrogen pickup was observed after nitrogen gas was blown into the trial heats. The nitrogen content was measured after the oxygen blow (first turndown) and after the nitrogen blow (second turndown). As shown by the measurements, there is either no nitrogen pickup or insignificant amounts of nitrogen pickup when nitrogen is blown into a steelmaking furnace to reduce temperature in the liquid steel. With respect to the trial heats showing a wider variation between the first and second turndown nitrogen measurements, for example trial heat no. 2 (FIG. 1), it is believed that such a variation in nitrogen a result of measurement error.

Figure 2:
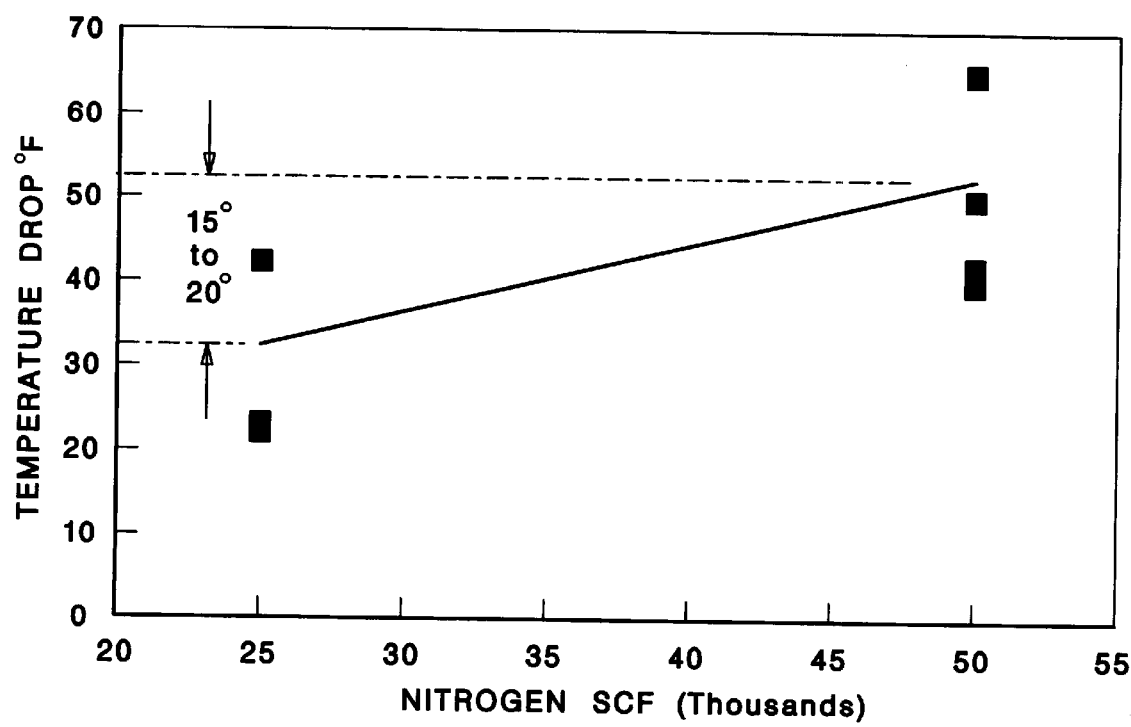
FIG. 2 is a graph showing the relationship between nitrogen flow rates and temperature drop in a liquid steel bath.
Figure 3:
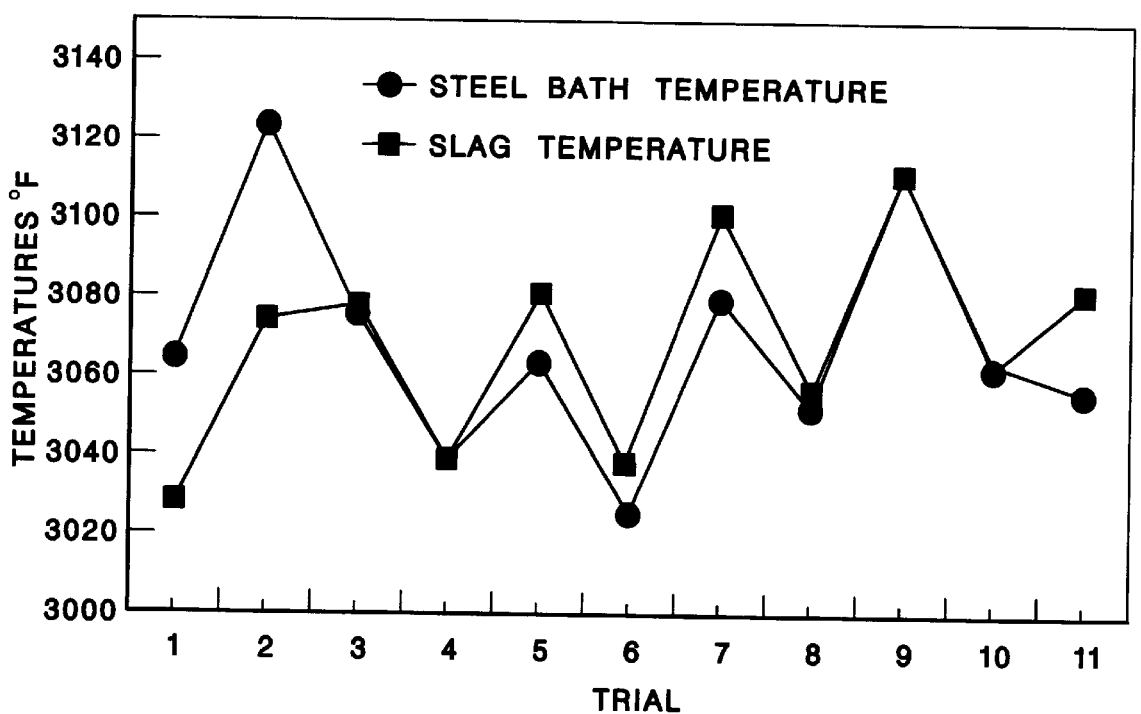
FIG. 3 shows steel and slag temperatures in a liquid steel bath after nitrogen blowing.

FIGS. 2 and 3 are related to bath temperature drop resulting from the blowing of nitrogen gas into the bath. As shown in FIG. 2, for the particular steelmaking conditions at the Burns Harbor No. 1 Furnace, if nitrogen gas is blown into the furnace at a flow rate of 25,000 scfm, the bath temperature decreases at a rate of between about 15° to 20° F. per minute. As indicated above, except for the two trial heats where the lance was raised 20 inches to determine the effect of different lance heights, the nitrogen blow lance height was the same as the lance height for the main oxygen blow. In such instances, the rate of temperature drop was essentially the same for both the steel and for the slag layer floating on the surface of the liquid steel. Such findings are supported by the steel and slag temperature data plotted in FIG. 3. The plotted temperature data shows there was no significant difference between the slag and steel temperature measurements taken after the final nitrogen turndown. This indicates that both temperatures dropped at about the same rate. However, in the two above-mentioned trials where the lance was raised to improve dephosphorization and desulfurization, it should be understood that operators measured a greater temperature drop for the slag layer than the liquid steel portion of the heat. As discussed above, such a temperature drop difference between the slag layer and the liquid steel is because the nitrogen is not penetrating as much into the steel reducing the cooling action of the metal as compared to the slag. This is particularly useful in superheated grades or heats where it is desirable to cool the slag layer with minimal cooling of the liquid steel.

Based on these and other trial results, the present cooling practices that charge solid coolant materials, for example limestone, iron ores and/or revert materials, into a steelmaking furnace may be replaced with a post oxidation nitrogen blow. In the preferred method for operating the steelmaking furnace, nitrogen blow is used on heats that turndown at least 20° F. hot (actual temperature 20° F. higher than aim temperature). However, it should be understood that nitrogen blow may be used on heats that turn down less than 20° F. hot without departing from the scope of this invention. As mentioned above, no nitrogen pick up has been observed with such nitrogen blow steelmaking practice, and therefore, it is expected that there is no grade restriction for a post oxidation nitrogen blow for the purpose of adjusting the bath to a target temperature.

Figure 4:
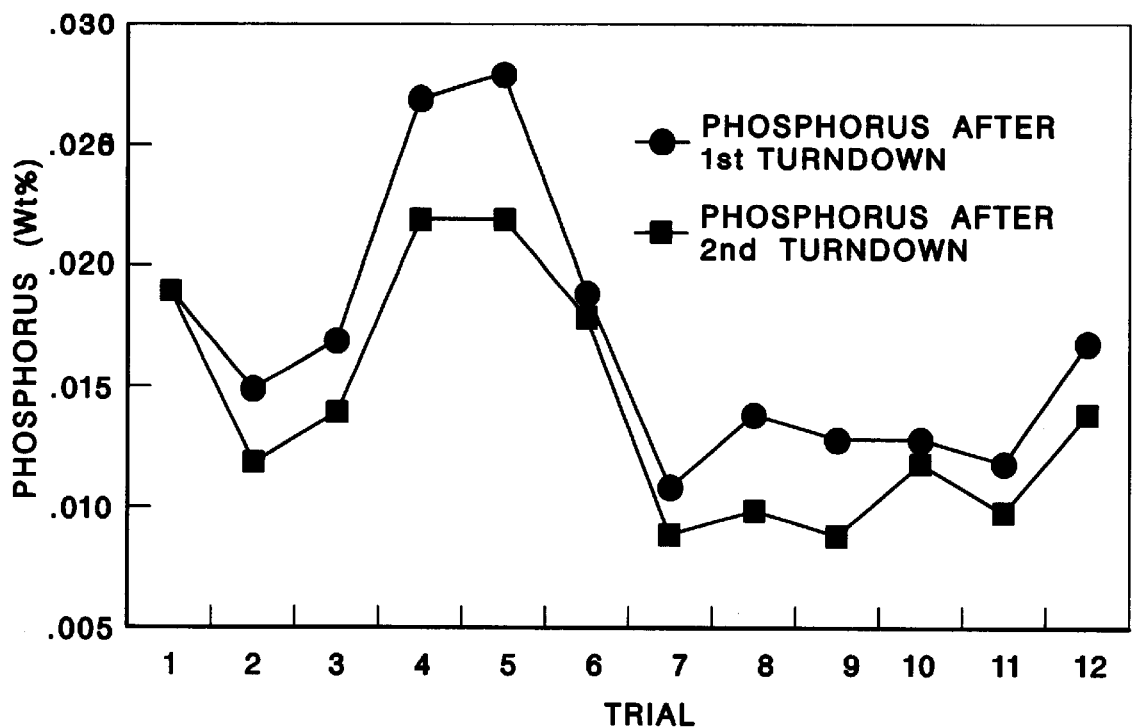
FIG. 4 shows the phosphorus content in a liquid steel bath after nitrogen blowing.

Of further significance in the present invention, as a result of the above, and other trial heats, it was discovered that in addition to providing bath cooling, post oxidation nitrogen blowing also provides metallurgical benefits. For example, referring to FIGS. 4-7, it can be seen that nitrogen blowing reduces phosphorus and sulfur as well as free or dissolved oxygen. Referring in particular to FIG. 4, showing the phosphorus content after the oxygen blow and after the nitrogen blow, the plotted data shows a reduced phosphorus level in the steel as a result of the nitrogen blow. Such phosphorus removal does not occur when using solid coolants of the past.

Phosphorus removal occurs through a reaction between the steelmaking slag and the liquid steel contained in the vessel. The reaction is exothermic, and it is favored by low bath temperature, by high levels of FeO in the liquid slag, by the slag layer volume, and by a high lime to silica ratio that raises the basicity of the slag. As disclosed above, we have discovered that the bath temperature can be lowered by blowing a nitrogen gas coolant into the steelmaking vessel after the steel refining process is completed. We have also unexpectedly discovered that a post refining nitrogen gas coolant blow facilitates phosphorus removal in the vessel.

The kinetics of phosphorus removal makes it very important that there is good slag/metal mixing within the vessel. The post refining nitrogen gas coolant blow of the present invention will effectively stir the bath increasing slag/metal mixing and causing undissolved lime in the bath to go into solution in the liquid slag layer. Such dissolution of lime increases the slag layer volume and raises the basicity of the slag, the increased slag volume and increased slag basicity favoring phosphorous removal as mentioned above. Our tests show that such nitrogen stirring improves phosphorus removal by about 0.001% to 0.002% when compared to current steelmaking practice.

Most steelmaking slags contain undissolved lime in amounts suitable for additional phosphorus removal after the steel refining process is completed. However, in those few instances where the lime content of the slag is insufficient for good additional phosphorus removal after refining, burnt lime may be added to the bath in amounts of between about 2000–4000 pounds to improve removal of phosphorus when a nitrogen gas coolant is blown into the vessel. Typically, however, the right amounts of lime are present in a steelmaking slag and no additional burnt lime needs to be added. As mentioned above, the presence of such undissolved amounts of lime is recognized by the "floaters" or "icebergs" on the liquid slag surface.

As shown in FIG. 4, our nitrogen blow trials caused a decrease in the phosphorus level in the heats tested. In these trials, phosphorus level was determined after the oxygen blow was completed (at turndown). The phosphorus content was relatively low, below about 0.030% by weight. However, when nitrogen gas was blown into the steelmaking vessel as a coolant, we noticed, by the absence of floaters, that the additional slag/steel stirring caused the undissolved lime to go into solution. Such additional dissolution of lime from blowing nitrogen gas coolant resulted in an increased slag volume and a higher slag basicity. This, in combination with the lower bath temperature from the coolant, further reduced phosphorus levels by between about 17–25% when compared to the phosphorus levels determined at turndown.

In current steelmaking operations, it is common practice to reblow the heat with oxygen when it is necessary to remove additional phosphorus and/or additional sulfur after turndown. Such oxygen reblows cause product yield loss and excessive refractory wear at the furnace lining. However, in the present invention, where a nitrogen gas coolant is blown into the vessel, there is no product yield loss and no acceleration refractory lining wear. In addition the temperature of the steel and slag is reduced which favors phosphorus removal. Oxygen reblows raise bath temperatures and thereby makes it more difficult to remove phosphorus contained in the bath. Therefore, greater amounts of oxygen are needed as compared to amounts of nitrogen needed for the same level of phosphorus reduction.

Figure 5:
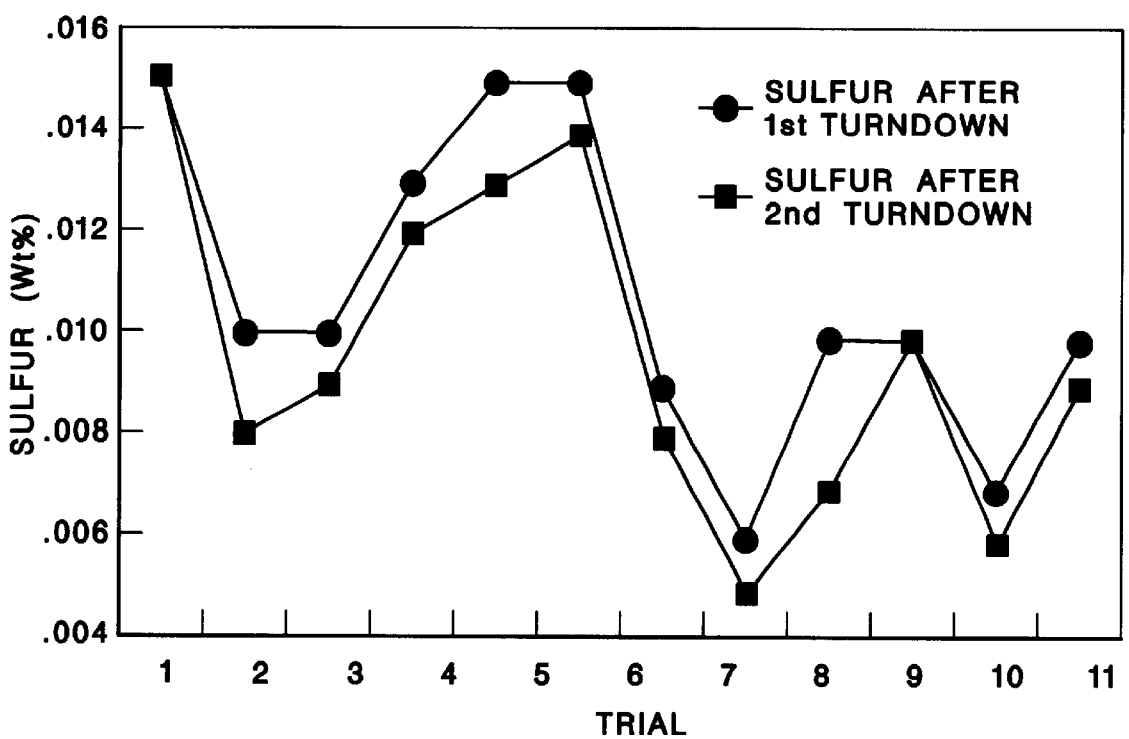
FIG. 5 shows the sulfur content in a liquid steel bath after nitrogen blowing.

FIG. 5 shows the sulfur content of the trial heats after the oxygen blow and after the nitrogen blow. Our trial results, plotted in FIG. 5, and as measured in other trials, show that the present post oxidation nitrogen blow invention removes on average 0.002% of sulfur with a standard deviation of about 0.001%. Sulfur removal from liquid steel is not effective under the oxidizing conditions found in a steelmaking furnace. However, when it is determined at turndown that the sulfur content in the steel is high, about, 0.010% sulfur or greater, the nitrogen gas coolant blow is able to remove sulfur from the steel into the slag. This is mainly due to the additional stirring and slag/metal mixing resulting from blowing the post oxidation nitrogen coolant into the bath.

Figure 6:
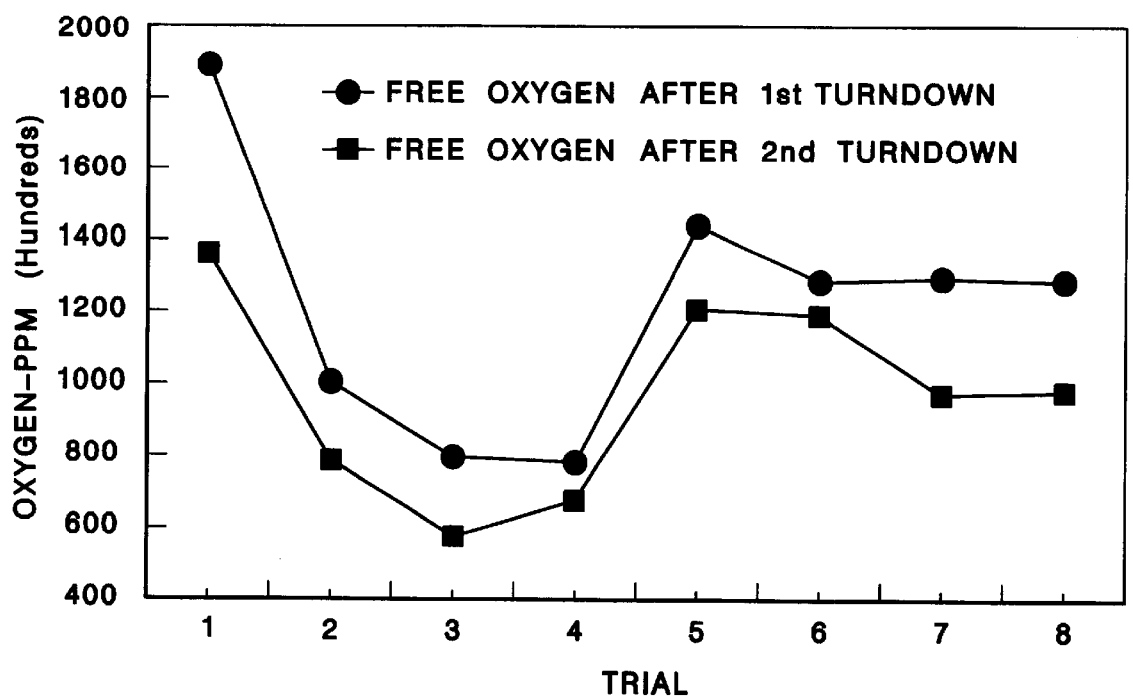
FIG. 6 shows free oxygen in a liquid steel bath after nitrogen blowing.

Referring to FIG. 6, showing amounts of free oxygen contained in the liquid steel after the oxygen and nitrogen blows, the post oxidation nitrogen blow will reduce the free oxygen in the steel. Reduced free oxygen levels in turn reduce the amount of aluminum additions need to deoxidize the steel during tapping at event (4). As above, because the post oxidation nitrogen blow practice improves stirring and slag/metal mixing, the free or dissolved oxygen in the steel is reduced by various reactions that take place as a result of the stirring. Therefore, less aluminum is needed at tap to remove the free oxygen from the steel during deoxidation. Our trial heats show aluminum reduction at tap in amounts of up to about 0.65 pounds of aluminum per ton steel.

Figure 7:
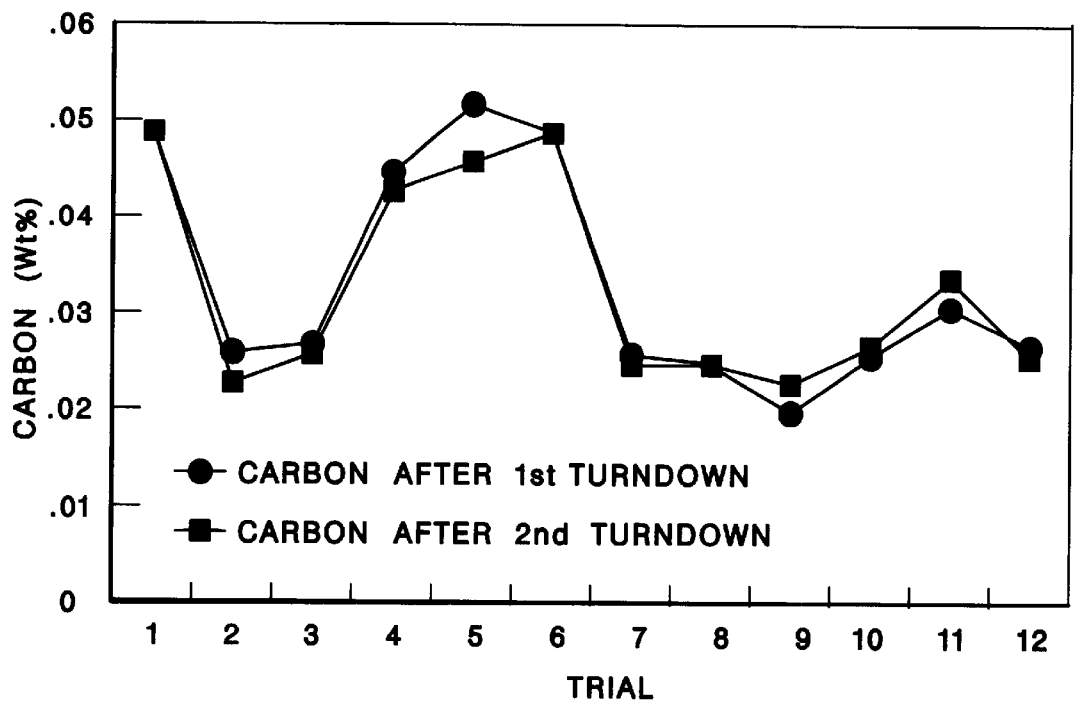
FIG. 7 shows the carbon content in a liquid steel bath after nitrogen blowing.

Finally, with respect to the present set of trial heats for our method for operating a steelmaking furnace, the post oxidation nitrogen blow caused insignificant or no changes in the carbon content of the liquid steel. Referring to FIG. 7, it can be seen that the carbon level remained relatively constant with only a slight drop in carbon in a few of the heats.

EXAMPLE 1

One exemplary procedure for operating a steelmaking furnace in accordance with the steps of the present nitrogen blow invention is as follows. The steelmaking furnace is charged with cold steel scrap and liquid carbon saturated iron (hot metal) in accordance with charge model calculations that produces a specified weight, temperature, and chemistry of steel at the end of the oxygen blow. An oxygen lance is lowered into the steelmaking furnace at a predetermined height above the charged materials and oxygen is blown into the steelmaking furnace. Shortly after ignition in the furnace, flux materials are added to the heat.

After the oxygen blow is completed, the steel temperature is measured at turndown and steel and slag samples are taken for chemical analysis. If the preliminary chemical analysis is within specification but the temperature of the bath is above the aim, the bath temperature is cooled to tapping temperature by blowing nitrogen gas into the heat using either the oxygen lance or an auxiliary top lance. Based upon the particular steelmaking furnace, and also based upon the temperature measurements after the oxygen blow, the nitrogen gas is blown into the furnace at a flow rate of, for example, between, 25,000 to 30,000 scfm, and for a set time period of, for example, between 1 to 5 minutes with the lance height being the same as the oxygen blow.

A second turndown is made and bath temperature is measured again to insure it has been lowered to a proper tapping temperature. If the measurement indicates the bath is at the aim, the furnace is rotated for tapping the liquid steel product for delivery to downstream manufacturing processes. As mentioned above, the post refining, or post oxidation nitrogen gas blow functions as a slag conditioner as well as a coolant. The nitrogen-cooled slag has an increased viscosity, and therefore, using a nitrogen gas as a coolant eliminates the need to add slag conditioners to facilitate splash-coating after tapping the heat. After the liquid steel is drained from the steelmaking furnace, the furnace is rotated to its upright position and the nitrogen coolant is blown into the vessel with a vertical lance to splash-coat the furnace refractory lining with the nitrogen conditioned slag, and the cooled "sticky" slag more readily adheres to the furnace lining to provide a protective slag layer that reduces refractory wear during steelmaking operations. After slag splash-coating, the furnace is rotated to its charge side for the start of a new heat.

EXAMPLE 2

In instances where the liquid steel is superheated for delivery to a downstream vacuum degassing operation, the steel is tapped at a temperature ranging from about 80–130° F. (45–72° C.) above conventional tap temperatures. In such heats, the exemplary procedure for operating a steelmaking furnace in accordance with the steps of the present nitrogen blow invention is similar to Example 1 wherein the nitrogen gas blow functions as a slag conditioner to provide a cooled "sticky" slag that more readily adheres to the furnace lining during slag splash-coating. Accordingly, in this example, the lance tip height is raised to a higher position above the bath to reduce the amount of nitrogen gas that penetrates the steel. This is done so that the nitrogen blow cools and conditions the slag layer with minimal cooling of the liquid steel product. As mentioned above, in a vacuum degassing operation, it is necessary to deliver the tapped liquid steel at a higher processing temperature to the degasser; however, it is still desirable to condition the slag for splash coating. Therefore the lance is raised to a higher position above the bath, and such proper lance height adjustments are determined by the steelmaking conditions at each particular operation, for example furnace geometry and capacity, aim bath temperature etc., and the lance height is adjusted accordingly for each particular steelmaking furnace.

EXAMPLE 3

In steelmaking operations such as, for example electric furnace shops, where solid steel scrap is charged into the furnace and melted with the heat generated from electrodes, the exemplary procedure for operating a steelmaking furnace in accordance with the steps of the present nitrogen blow invention is the same as Example 1 with the exception of the charging cycle. In an electric furnace operation, only solid material is charged into the steelmaking furnace and electrodes are lowered into the furnace to melt the scrap into liquid steel. After the liquid steel is formed, an oxygen lance is inserted into the furnace and oxygen is blown to combust the materials. The remaining steps of the electric steelmaking process are carried out similar to the above Example 1.

It should be understood that while this invention has been described as having a preferred embodiment, it is capable of further modifications, uses, and/or adaptations of the invention, following the general principle of the invention and including such departures from the present disclosure as have come within known or customary practice in the art to which the invention pertains, and as may be applied to the central features hereinbefore set forth, and fall within the scope of the invention of the limits of the appended claims. For example, while the detailed description teaches blowing nitrogen gas as a coolant, any inert gas, such as argon, may be blown as a post refining coolant without departing from the scope of this invention. However, it is understood that nitrogen is the cooling gas of choice for cost considerations. It should also be understood that this invention is not limited to any particular type of metallurgical furnace or to any particular gas delivery system, and that any suitable gas lance or tuyere arrangement may be used to blow a post refining nitrogen gas coolant without departing from the scope of this invention.

We claim:

1. A method for operating a steelmaking furnace to manufacture a carbon steel product, the steps of the method comprising:

charging steelmaking materials into the steelmaking furnace;

blowing oxygen into the steelmaking furnace;

discontinuing the oxygen blow when the charged steelmaking materials are refined to a liquid carbon steel product;

determining temperature of the liquid carbon steel product;

blowing a nitrogen gas coolant into the steelmaking furnace to reduce the temperature of the liquid carbon steel product to an aim tapping temperature;

discontinuing said nitrogen gas coolant blow when the liquid carbon steel product temperature is lowered to said aim tapping temperature; and tapping said liquid carbon steel product at said aim tapping temperature for downstream processing.

2. The method according to claim 1 wherein said nitrogen gas coolant is blown into the steelmaking furnace at a gas flow rate of between about 20,000 to 40,000 scfm (566 to 1132.68 cubic meters per minute).

3. The method according to claim 2 wherein said nitrogen is blown into the steelmaking furnace at a gas flow rate of up to about 40,000 cubic feet (1132.68 cubic meters per minute).

4. The method according to claim 1 wherein said nitrogen gas coolant is blown into the steelmaking furnace for a period of up to about 5 minutes.

5. The method according to claim 1 wherein said nitrogen gas coolant is blown into the steelmaking furnace through a top lance.

6. The method according to claim 5 wherein said top lance is positioned at a lance height that causes said nitrogen gas coolant blow to reduce a slag layer temperature at a greater cooling rate than a cooling rate for the liquid carbon steel product.

7. The method according to claim 1 wherein said nitrogen gas coolant blow reduces phosphorus in the liquid carbon steel product.

8. The method according to claim 1 wherein said nitrogen gas coolant blow reduces sulfur in the liquid carbon steel product.

9. The method according to claim 1 wherein said nitrogen gas coolant blow reduces oxygen in the liquid carbon steel product.

10. the method according to claim 1 wherein said nitrogen gas coolant blow conditions slag contained in the steelmaking vessel, said conditioned slag having an increased viscosity to improve slag splash coating after the liquid carbon steel product is tapped.

11. A method for lowering temperature in a finished liquid carbon steel product contained in a steelmaking vessel to an aim tapping temperature, the steps of the method comprising blowing a post refining nitrogen gas coolant into the finished liquid carbon steel product at a selected gas flow rate over a selected time period determined to lower the finished liquid carbon steel product temperature to said aim tapping temperature.

12. The method according to claim 11 wherein said nitrogen gas coolant blow reduces phosphorus in said finished liquid carbon steel product by improving mixing of the finished liquid carbon steel product with a slag layer.

13. The method according to claim 12 wherein said improved mixing reduces phosphorus by increasing slag layer volume.

14. The method according to claim 13 wherein said slag layer volume is increased by said improved mixing causing undissolved lime to go into solution in the slag layer.

15. The method according to claim 12 wherein said improved mixing reduces phosphorus in the finished liquid carbon steel product by raising slag basicity.

16. The method according to claim 15 wherein said slag basicity is increased by said improved mixing causing undissolved lime to go into solution in the slag layer.

17. The method according to claim 11 wherein said nitrogen gas blow reduces sulfur in said finished liquid carbon steel product.

18. The method according to claim 11 wherein said nitrogen gas blow reduces dissolved oxygen in said finished liquid carbon steel product.

19. The method according to claim 11 including the further step of blowing a said nitrogen gas coolant into a finished liquid carbon steel product refined in a BOF.

20. The method according to claim 11 including the further step of blowing a said nitrogen gas coolant into a finished liquid carbon steel product refined in an electric arc furnace.

21. The method according to claim 12 wherein said nitrogen gas blow reduces iron oxide in said slag layer.

* * * * *